(12) United States Patent
Okazaki et al.

(10) Patent No.: US 10,559,803 B2
(45) Date of Patent: Feb. 11, 2020

(54) BUS BAR HOLDING STRUCTURE

(71) Applicant: Yazaki Corporation, Minato-ku, Tokyo (JP)

(72) Inventors: Yutaro Okazaki, Kakegawa (JP); Akito Toyama, Makinohara (JP); Shuhei Ejima, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 165 days.

(21) Appl. No.: 15/867,129

(22) Filed: Jan. 10, 2018

(65) Prior Publication Data

US 2018/0219202 A1 Aug. 2, 2018

(30) Foreign Application Priority Data

Jan. 31, 2017 (JP) ................................. 2017-016297

(51) Int. Cl.
*H01M 2/22* (2006.01)
*H01M 2/20* (2006.01)

(52) U.S. Cl.
CPC .................................. *H01M 2/202* (2013.01)

(58) Field of Classification Search
CPC ...... H01M 2/202; H01R 13/518; H01R 13/41
See application file for complete search history.

(56) References Cited

U.S. PATENT DOCUMENTS

| 2012/0015550 A1 | 1/2012 | Ikeda et al. |
| 2012/0208410 A1 | 8/2012 | Ikeda et al. |
| 2012/0212232 A1 | 8/2012 | Ikeda et al. |
| 2013/0280959 A1 | 10/2013 | Takase et al. |
| 2014/0311768 A1 | 10/2014 | Takishita et al. |

FOREIGN PATENT DOCUMENTS

| JP | 2011040332 A | 2/2011 |
| JP | 2012199007 A | 10/2012 |
| JP | WO2011021614 A1 | 1/2013 |
| JP | WO2011052699 A1 | 3/2013 |
| JP | 2013062218 A | 4/2013 |
| JP | 2013178969 A | 9/2013 |
| JP | 2015035323 A | 2/2015 |
| JP | 2015138604 A | 7/2015 |
| JP | 2016-091772 A | 5/2016 |
| JP | 2016134275 A | 7/2016 |

OTHER PUBLICATIONS

May 28, 2019—(JP) Notice of Reasons for Refusal—App 2017-016297, Eng Tran.

*Primary Examiner* — Cynthia K Walls
(74) *Attorney, Agent, or Firm* — Banner & Witcoff, Ltd.

(57) ABSTRACT

A bus bar holding structure includes a bus bar, an insulating resin-made wire distribution body holding the bus bar. The bus bar electrically connects together an adjacent terminals of a plurality of unit cells each having positive pole and negative pole electrode terminals. The bus bar includes a plate-shaped main body and a wire connecting part extended from the plate-shaped main body and connected to an end of a wire. The plate-shaped main body includes a fold-back part and a plurality of plate parts separated from each other at the fold-back part and folded back at the fold-back part so as to be superimposed with each other. The plate-shaped main body and the wire connecting part are formed integrally.

3 Claims, 9 Drawing Sheets

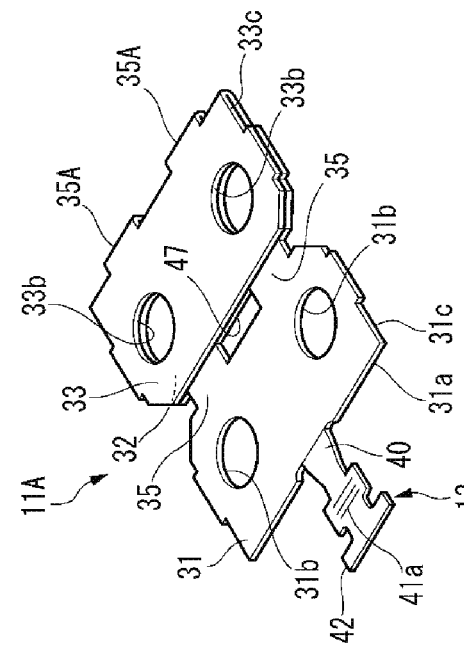
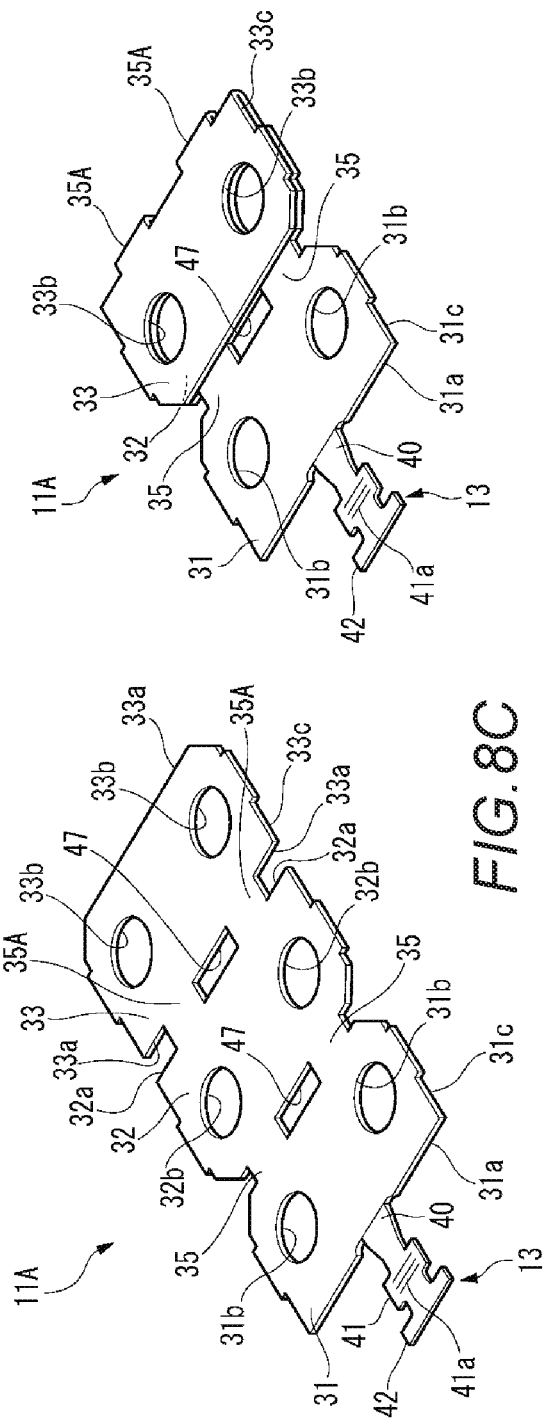
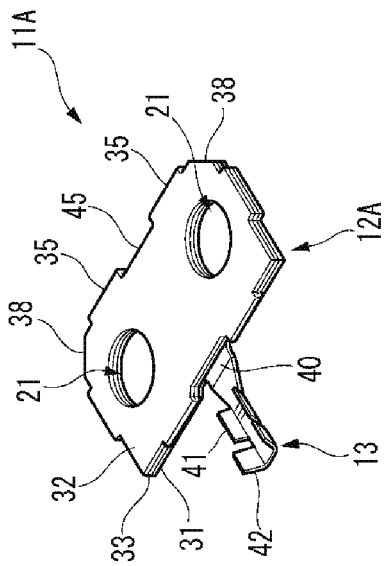

BUS BAR HOLDING STRUCTURE

CROSS REFERENCE TO RELATED APPLICATIONS

This application claims priority from Japanese Patent Application No. 2017-016297 filed on Jan. 31, 2017, the entire contents of which are incorporated herein by reference.

BACKGROUND OF THE INVENTION

Field of the Invention

The invention relates to a bus bar holding structure for electrically connecting adjacent unit cells of a battery assembly.

Description of Related Art

A battery assembly including a plurality of unit cells is configured such that electrode terminals of adjacent unit cells are electrically connected to each other by bus bars.

As shown in FIG. 9, an example of a bus bar includes a plate-shaped main body 501 to be stretched between adjacent electrode terminals and a wire connection part 502 extended from the main body 501 to be connected to the end of a detection wire, in which the main body 501 has a two-layer structure configured such that a first plate part 504 and a second plate part 505 separated at a fold-back part 503 are folded back 180 degrees by the fold-back part 503 so as to be superimposed on top of each other (see the patent document 1: JP-A-2016-91772).

In this bus bar, a locking piece 506 provided on and extended from such a long side lateral edge 504 of the first plate part 504 as is parallel to the fold-back part 503 is bent along the outer surface of the second plate part 505, thereby stopping the opened state of the first and second plate parts 504 and 505. Further, the bus bar includes, in the side edge of the first plate part 504 except for the fold-back part 503, a side edge covering part 507 which rises along the side edge of the second plate part 50 except for the fold-back part 503 in a state where the first and second plate parts 504 and 505 are superimposed on top of each other, thereby making it hard for foreign substances to enter between the two layers.

This bus bar is held by a locking part in a bus bar storing part of an insulating resin-made insulation holding member (wire distribution body) to be mounted onto a battery assembly, thereby electrically connecting electrode terminals of a plurality of adjacent unit cells.
[Patent Document 1] JP-A-2016-91772

According to a related art, a bus bar includes a fold-back part and side edge covering part in aside edge. The fold-back part and the side edge covering part are locked by a locking part of a wire distribution body and are held in a bus bar storing part. Since the fold-back part and the side edge covering part are bent by press working, the locking part is caught on a bending R section of the fold-back part etc. and is thereby stopped (locked). This reduces a locking margin of the locking part, thereby lowering a holding force.

SUMMARY

One or more embodiments provide a bus bar holding structure which can enhance a holding force provided by a locking part of a wire distribution body with respect to a bus bar configured such that its a plurality of plate parts are folded back by a fold-back part so as to be superimposed on top of each other.

In an aspect (1), one or more embodiments provide a bus bar holding structure includes a bus bar and an insulating resin-made wire distribution body holding the bus bar. The bus bar electrically connects together an adjacent terminals of a plurality of unit cells each having positive pole and negative pole electrode terminals. The bus bar includes a plate-shaped main body and a wire connecting part extended from the plate-shaped main body and connected to an end of a wire. The plate-shaped main body includes a fold-back part and a plurality of plate parts separated from each other at the fold-back part and folded back at the fold-back part so as to be superimposed with each other. The plate-shaped main body and the wire connecting part are formed integrally. The wire distribution body includes a locking part which locks lateral edges of the plate-shaped main body so as to hold in a bus bar storing part. The fold-back part includes a notch having a vertical side surface parallel to a peripheral wall of the bus bar storing part. The locking part locks a peripheral edge of the notch.

In an aspect (2), the peripheral wall of the bus bar storing part includes an engagement projection which engages with the notch so as to position the bus bar.

In an aspect (3), the locking part is a locking arm formed in the engagement projection.

According to the aspect (1), since the locking part of the wire distribution body holds the peripheral edge of the notch having a vertical side surface parallel to the peripheral wall of the bus bar holding part, a locking margin can be secured. Thus, the locking part can positively lock the lateral edge of the bus bar including the fold-back part, thereby enhancing its holding force.

According to the aspect (2), since the bus bar is positioned such that the notch is engaged by the engagement projection of the bus bar storing part, there is eliminated the need to position the peripheral lateral edge by the peripheral wall of the bus bar storing part.

Thus, the dimensional precision of the bus bar storing part can be alleviated, thereby enabling reduction of the molding cost of the wire distribution body (mold cost).

According to the aspect (3), the locking arm formed in the engagement projection for positioning the bus bar in the bus bar storing part can positively lock the main body of the bus bar. That is, since the locking arm locks the positioned part of the main body, positive locking can be attained.

According to one or more embodiments, in a bus bar holding structure, a holding force provided by a locking part of a wire distribution body can be enhanced with respect to a bus bar configured such that its a plurality of plate parts are folded back by a fold-back part so as to be superimposed on top of each other.

Brief description has been given heretofore of the invention. Further, to read through a mode (which is hereinafter called [embodiment]) for carrying out the invention with reference to the accompanying drawings will clarify the details of the invention further.

BRIEF DESCRIPTION OF THE DRAWINGS

FIGS. 3A and 3B are respectively perspective views of the respective steps of the bus bar working process.

FIGS. 8A to 8C are explanatory views of a working process of a bus bar according to a modification of the embodiment. FIGS. 8A to 8C are respectively perspective views of the respective steps of the bus bar working process.

DETAILED DESCRIPTION

Exemplary embodiments are described with reference to the drawings.

Figure 1:
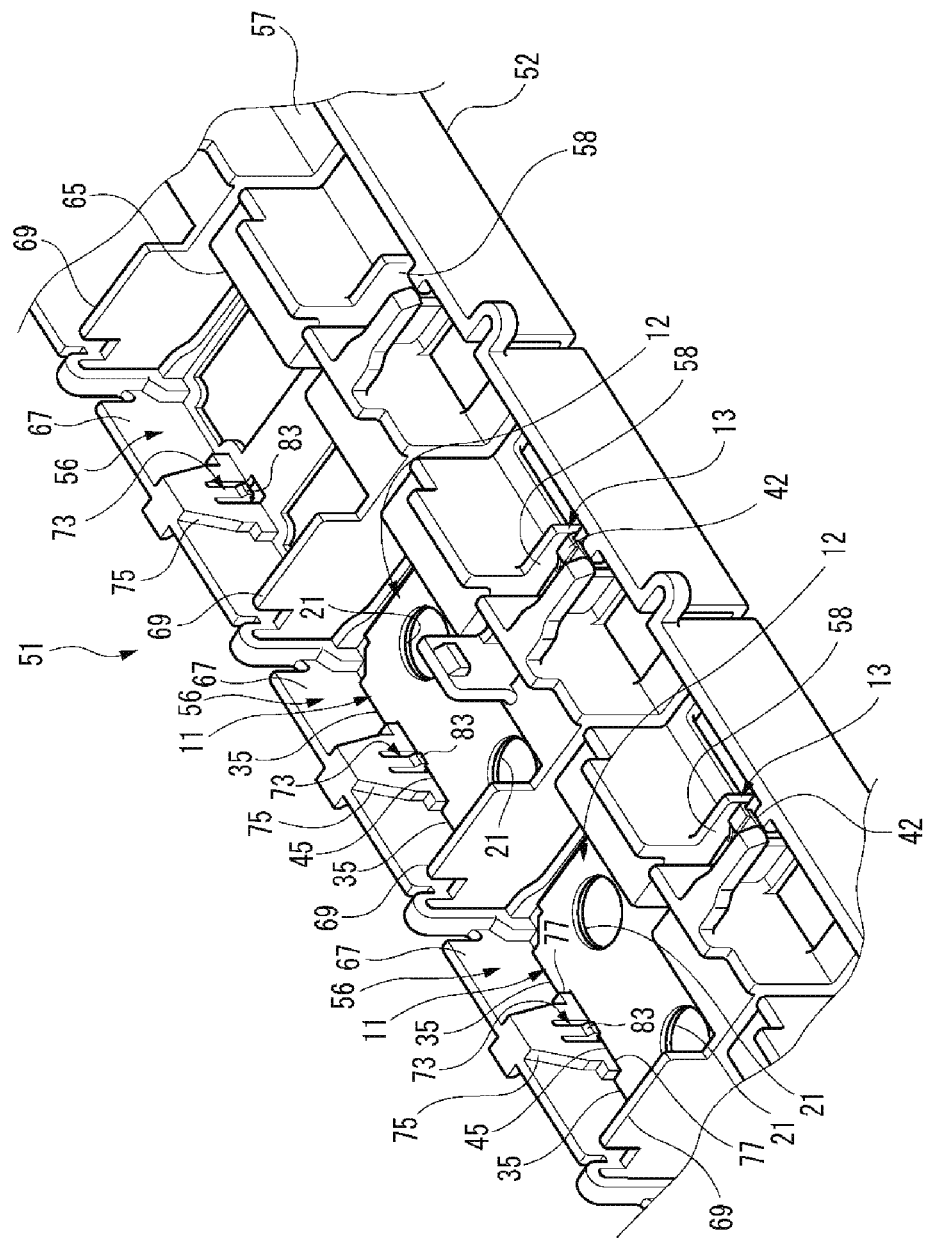
FIG. 1 is a plan view of a part of a bus bar module having a bus bar holding structure according to an embodiment of the invention.

As shown in FIG. 1, a bus bar module 51 having a bus bar holding structure according to an embodiment of the invention is mounted in a state where it is superimposed on a battery assembly constituting a power supply. As the power supply, there is known a power supply which is mounted on an electric car running using an electric motor, a hybrid car running using an engine and an electric motor in combination etc. and supplies power to these electric motors.

The bus bar module 51 includes a wire distribution body 52 made of insulating resin. The wire distribution body 52 includes a plurality of frame-shaped bus bar storing parts 56 in which bus bars 11 are respectively stored and held together with wires 15 for detecting the voltages of unit cells.

Figure 2:
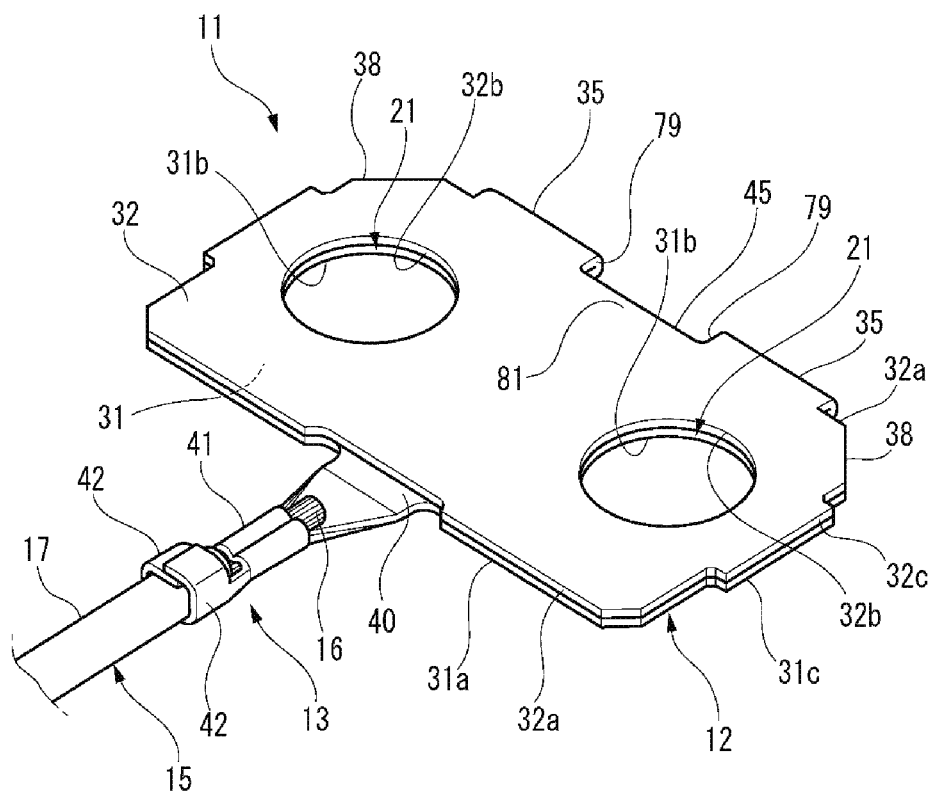
FIG. 2 is a perspective view of the bus bar shown in FIG. 1.

As shown in FIG. 2, the bus bar 11 according to this embodiment includes a main body 12 and a wire connection part 13. The bus bar 11 is produced by pressing a conductive metal plate or by similar working. The main body 12 is formed in a rectangular plate-like shape and is stretched between the adjacent electrode terminals of unit cells constituting the battery assembly in order to electrically connect together the adjacent electrode terminals. The wire connection part 13 is extended from the main body 12 and is connected to the end of the electric wire 15.

The main body 12 is formed in a substantially rectangular plate-like shape and has a pair of connection holes 21 which are formed to penetrate through the plate surface thereof and through which electrode terminals of a positive pole and a negative pole of mutually adjacent unit cells can be inserted. The paired connection holes 21 are arranged at the same interval as an interval between the electrode terminals of the positive and negative poles of the mutually adjacent unit cells.

The main body 12 includes a plurality of plate parts 31, having substantially the same outer shapes (the substantially rectangular shapes respectively having long side lateral edges 31a, 32a and short side lateral edges 31c, 32c), while the upper layer (uppermost layer) plate part 32 is superimposed on top of the lower layer (lowermost layer) plate part 31. In this embodiment, the main body 12 has a double structure. The one-side arranged long side lateral edges 31a and 32a of the plate parts 31 and 32 are connected together by fold-back parts 35. The fold-back parts 35 are formed at intervals in the longitudinal direction, while the plate parts 31, 32 are separated by the fold-back parts 35. The plate parts 31, 32 are folded back by the fold-back parts 35 and are superimposed on top of each other. The plate parts 31 and 32 respectively have holes (connection holes) 31b and 32b and, when they are superimposed, the holes 31b and 32b communicate with each other to provide the connection hole 21 of the main body 12.

Also, the main body 12 includes chamfer parts 38 in the corners thereof between the long side lateral edges 31a, 32a and short side lateral edges 31c, 32c respectively arranged on the side where the fold-back parts 35 are disposed.

The wire connecting part 13 is extended on the opposite side of the connecting portion of the plate parts 31 and 32 of the main body 12. The electric wire 15 is electrically connected to the end of the wire connecting part 13. Thus, the bus bar 11 is connected through the electric wire 15 connected to the wire connecting part 13 to a voltage detection circuit included in an ECU (Electronic Control Unit) (not shown). And, the ECU detects the residual capacity, charge and discharge states etc. of the respective unit cells based on potential differences (voltages) between the paired electrodes of the respective unit cells detected by the voltage detection circuit.

The electric wire 15 is a known covered electric wire which has a conductive core wire 16 and an insulating coating 17 covering the core wire 16. In the end of the electric wire 15, the insulating coating 17 is peeled, whereby the core wire 16 is exposed.

The wire connecting part 13 is formed in such side edge of the lower layer plate part 31 as exists on the opposite side of the fold-back part 35. The wire connecting part 13 is formed in a connecting part 40 extended from the lower layer plate part 31, and includes a pair of conductor crimp pieces 41 and a pair of wire caulking pieces 42. Such portion of the insulating coating 17 as exists in the end of the electric wire 15 is caulked by the wire caulking pieces 42 and is thereby fixed, while the core wire 16 is crimped to the conductor crimp pieces 41. Thus, the electric wire 15 is electrically connected to the wire connecting part 13. Here, the wire connecting part 13 is formed to have a predetermined thickness smaller than the plate part 31 suitable for crimping of the electric wire 15 by a crimping machine.

Further, the main body 12 includes, in a portion of the fold-back part 35, a notch 45 having a vertical side surface 53 (see FIG. 5) parallel to the peripheral wall of the bus bar storing part 56. The notch 45 is formed in the central portions of the one-side arranged long side lateral edges 31a and 32a in the longitudinal direction. As a result, in the one-side arranged long side lateral edges, there are partially formed a pair of fold-back parts 35 across the notch 45.

As described above, due to the structure that the main body 12 is formed by superimposing the a plurality of plate parts 31, 32 on top of each other, the bus bar 11 of this embodiment can suppress upsizing of the wire connecting part 13 and can reduce electric resistance in the main body 12 as much as possible.

Figure 3A:
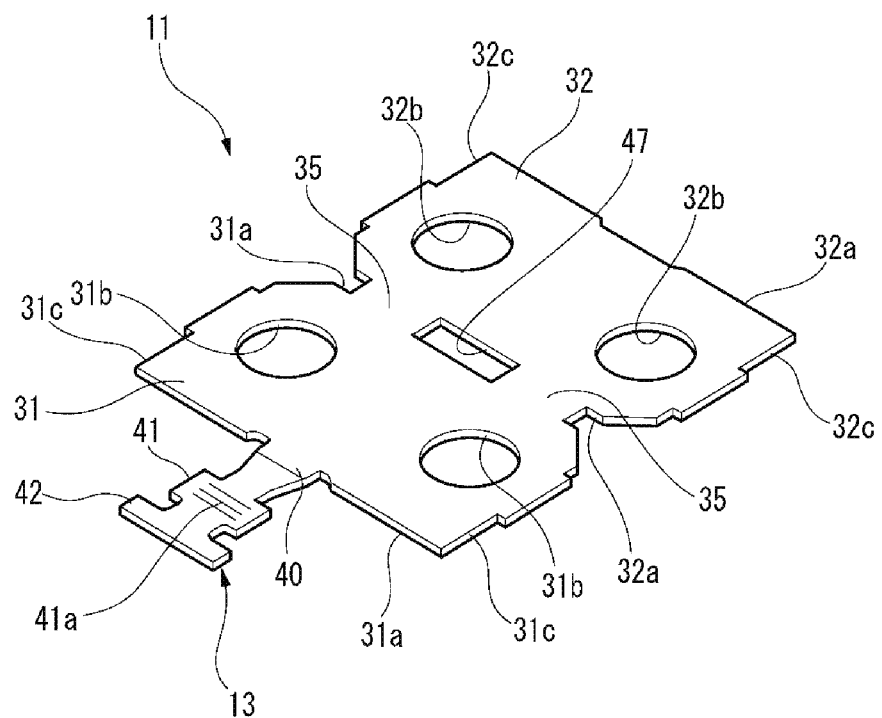
FIGS. 3A and 3B are explanatory views of a working process of a bus bar according to the embodiment.
Figure 3B:
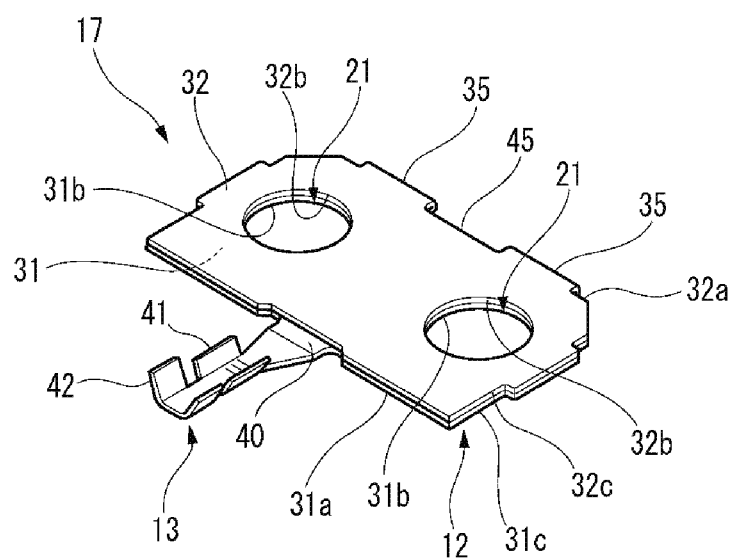

Next, description is given of the processing procedure of the above-configured bus bar 11 with reference to FIGS. 3A and 3B.

As shown in FIG. 3A, a metal plate is pressed to form a developed shape of the bus bar 11 before bending. At this time, in the central portion of the fold-back part 35 in the extending direction, there is punched out a rectangular opening used to form the notch 45. A portion where the wire connecting part 13 is to be formed is pressed into a predetermined thickness. Also, in such portion of the conductor crimp piece 41 as provides the inside when caulking the core wire 16, there is worked a serration 41a. Here, the bus bar 11 before bending may preferably be formed of a chain terminal material.

As shown in FIG. 3B, by bending, the upper layer plate part 32 is folded back at the fold-back part 35 and is superimposed on the lower layer plate part 31. At this time, the main body 12 is folded by the fold-back part 35 at a position where the opening 47 is divided into two, whereby the notch 45 is formed in the one-side arranged long side lateral edges. Also, in the wire connecting part 13, in order that the electric wire 15 can be set on the crimping machine for crimping the electric wire 15, the conductor crimp pieces and wire caulking pieces 42 are raised.

In this manner, there is obtained the bus bar 11 including the main body 12 composed of the two superimposed plate parts 31 and 32 and the wire connecting part 13 to which the electric wire 15 can be connected.

Figure 4:
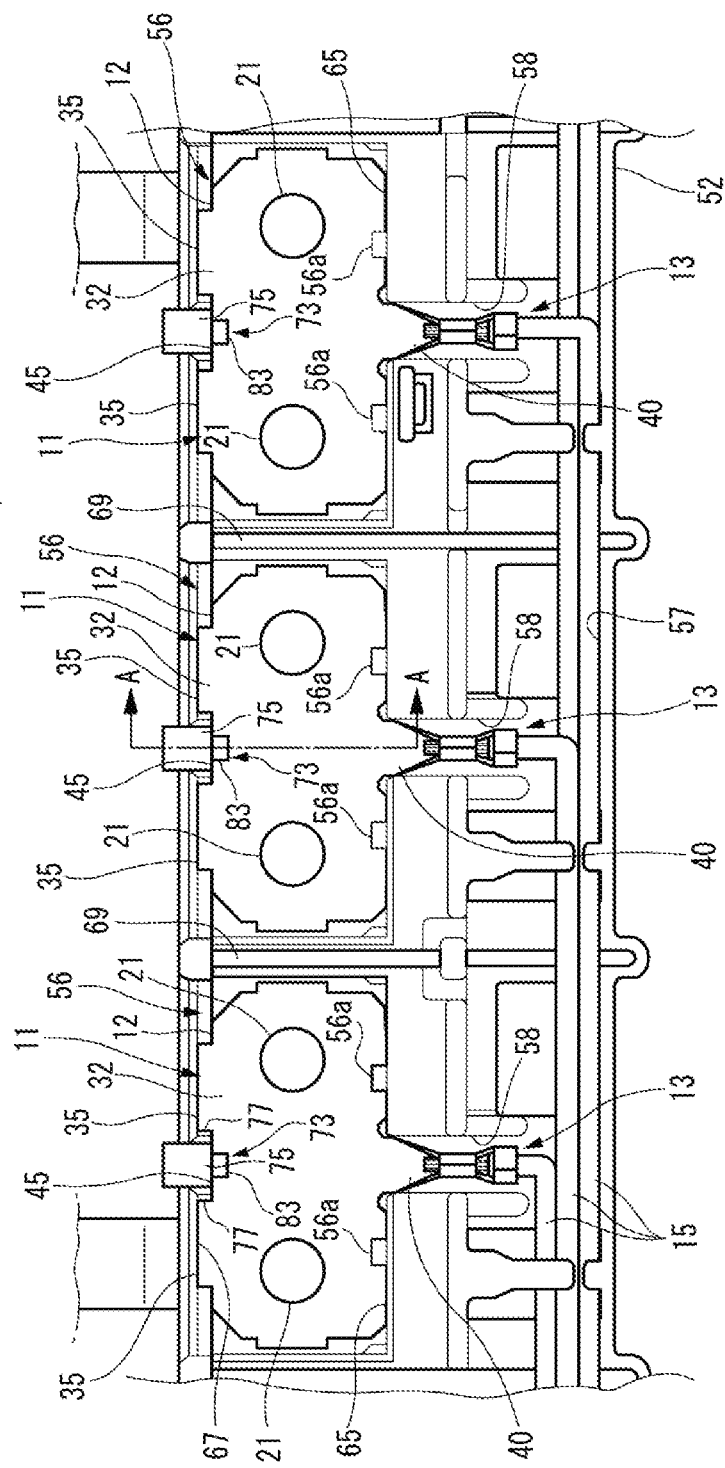
FIG. 4 is a plan view of a part of a bus bar module having a bus bar holding structure according to the embodiment.
Figure 5:
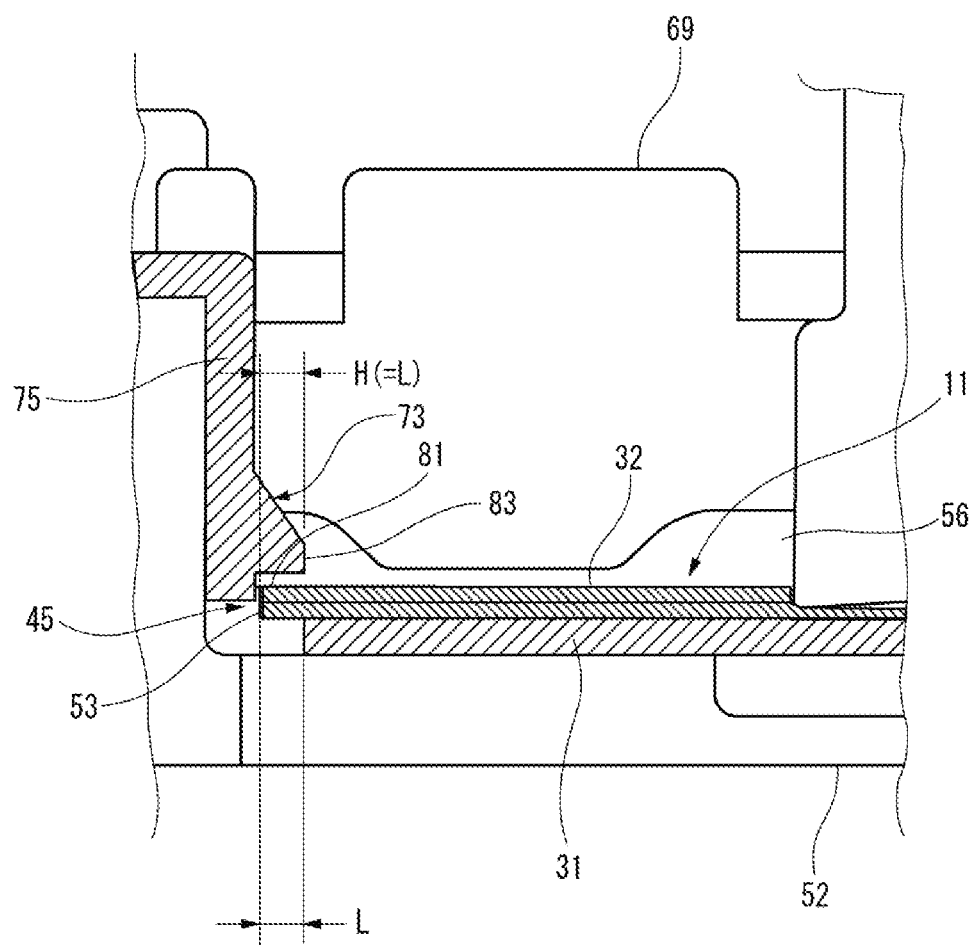
FIG. 5 is a section view taken along the A-A arrow shown in FIG. 4.

FIG. 4 is a plan view of a part of a bus bar module 51 including a bus bar holding structure according to this embodiment, and FIG. 5 is a section view taken along the A-A arrow shown in FIG. 4.

The wire distribution body 52 includes a wire distribution groove 57 and a connecting groove 58. In the wire distribution groove 57, there is stored the electric wire 15 and, in the connecting groove 58, there is stored the wire connecting part 13 of the bus bar 11 with the electric wire 15 connected thereto.

With the bus bar 11 stored in the bus bar storing part 56, an electrode terminal (not shown) of a unit cell is inserted into the connection hole 21 of the main body 12 and a nut (not shown) is screwed to the electrode terminal. And, by tightening this nut, the bus bar 11 is fastened and fixed to the electrode terminal.

After the bus bar module 51 is mounted on the battery assembly, before the bus bar 11 is fastened and fixed to the electrode terminal by the nut, in a state where the bus bar 11 is stored in the bus bar storing part 56, in some cases, the bus bar module 51 may be transferred by delivery or by transportation. Therefore, in the bus bar storing part 56, there is formed a locking section for locking the lateral edge of the main body 12 to thereby hold the main body 12 in the bus bar storing part 56.

The bus bar storing part 56 includes a wire lead-out side wall 65 and a counter lead-out side wall 67 which are peripheral walls in a direction along the pole column arrangement direction. The wire lead-out side wall 65 is opposed to the long side lateral edges 31a and 32a existing on the opposite side of the folding part 35, while the counter lead-out side wall 67 is opposed to the long side lateral edges 31a and 32a on the side of the folding part 35. The wire lead-out side wall 65 and counter lead-out side wall 67 define the rectangular bus bar storing part 56 in cooperation with a pair of bulkheads 69 and surround the main body part 12.

Figure 7:
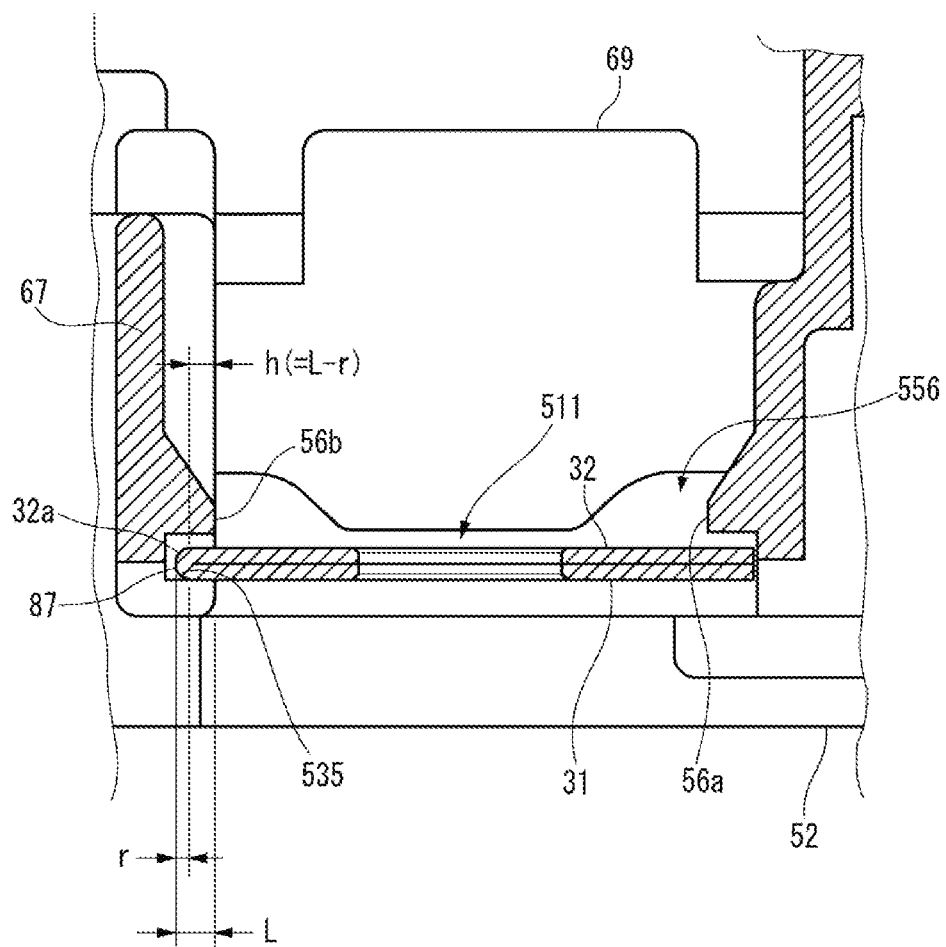
FIG. 7 is a section view taken along the B-B arrow shown in FIG. 6.
Figure 9:
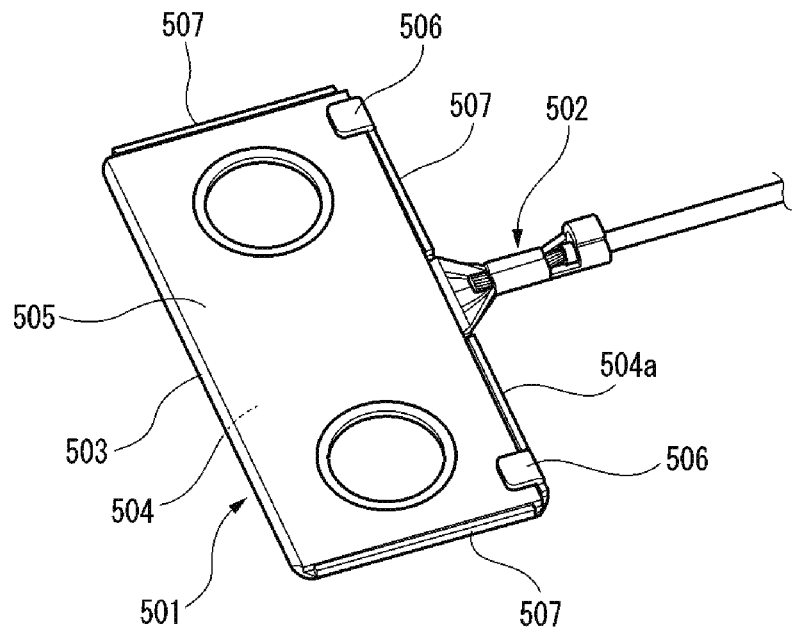
FIG. 9 is a perspective view of a bus bar according to the related art.

The locking part of this embodiment is constituted of a pair of locking arms 56a and one locking arm 73. The paired locking arms 56a are arranged across the wire lead-out side wall 65 and are used to lock the long side lateral edges 31a and 32a on the opposite side of the folding part 35. Each locking arm 56a projects from the wire lead-out side wall 65 toward the inside of the bus bar storing part 56, while its upper surface is formed as an inclined surface, thereby facilitating mounting of the bus bar 11 (see FIG. 7).

On the peripheral wall (counter lead-out side wall 67) of the bus bar storing part 56, there is formed an engagement projection 75 which can be engaged with the notch 45 to thereby attain at least the positioning of the bus bar 11. The engagement projection 75 is formed in a triangular plate shape having a pair of skirt-spread legs 77 and projects from the counter lead-out side wall 67. The vertical side surface 53 of the notch 45 is opposed to the surface of the engagement projection 75, while a pair of cutting surfaces 79 (see FIG. 2) of the notch 45 spaced from each other in the pole column arrangement direction are opposed to the outside of the paired legs 77. The bus bar 11 is positioned in a state where its movement in the pole column arrangement direction is regulated due to the engagement of the rectangular notch 45 with the engagement projection 75.

The locking arm 73 constituting the locking part is formed between the paired legs 77 of the engagement projection 75 and is used to lock a peripheral edge (deep end edge 81) of the notch 45 extending perpendicularly to the vertical side surface 53. The locking arm 73 is formed in a cantilever beam shape in which its base end is connected to the counter lead-out side wall 67 and its tip end hangs down as a free end. Thus, the tip end of the locking arm 73 is elastically displaceable in the inward and outward directions with respect to the bus bar storing part 56. The locking arm 73 has a locking pawl 83 in its tip end and the upper surface of the locking pawl 83 is formed as an inclined surface, thereby facilitating mounting of the bus bar 11 (see FIG. 5).

Incidentally, the engagement projection 75 is not an indispensable configuration requirement. In the case that the engagement projection 75 is not formed, the locking arm 73 is formed directly in the counter lead-out side wall 67 in a shape which enables it to be locked to the notch 45.

Next, description is given of the operation of the above configuration.

Figure 6:
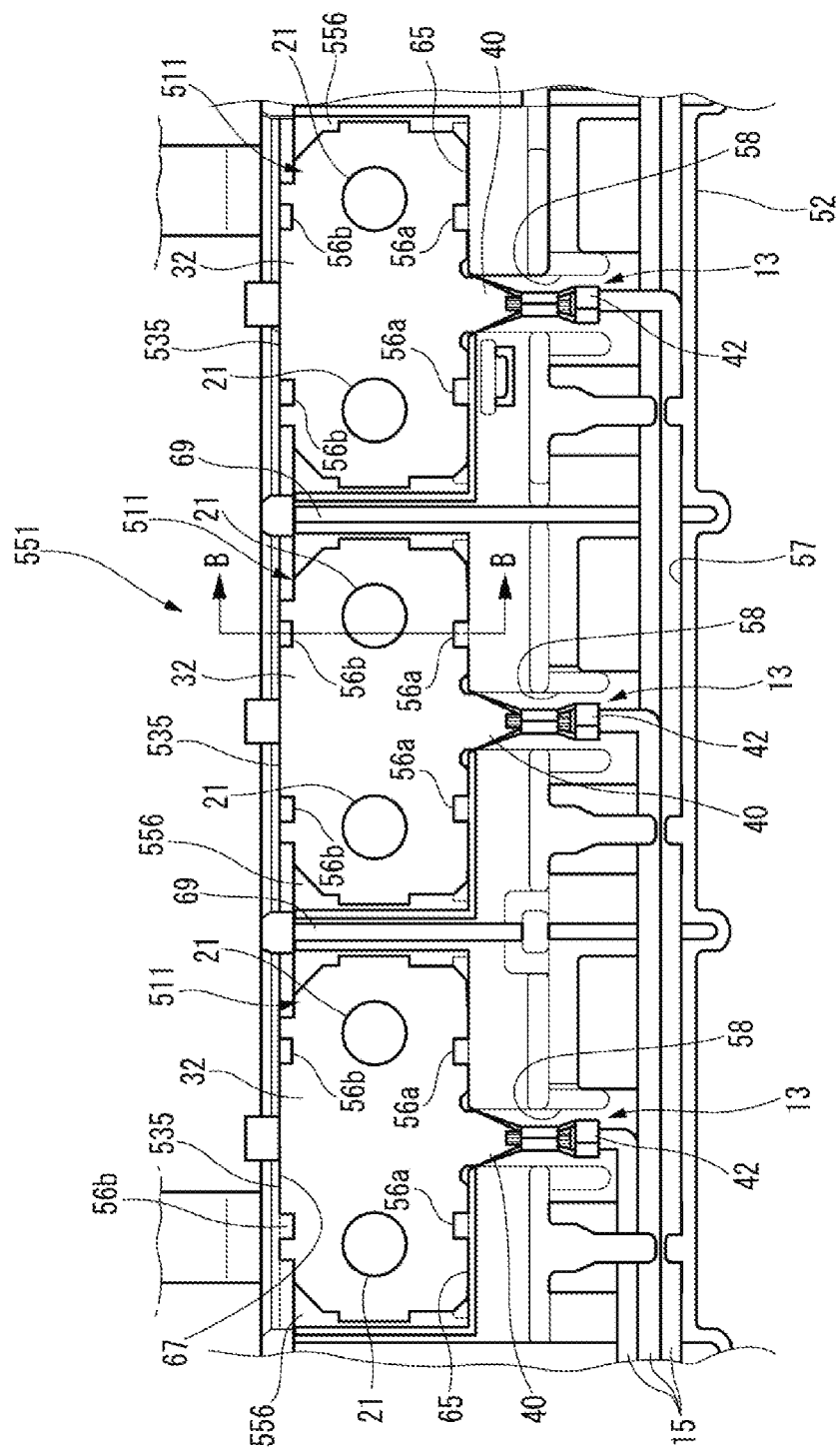
FIG. 6 is a plan view of a part of a bus bar module having a bus bar holding structure by which a fold-back part is locked.

Firstly, with reference to FIG. 6, description is given of a bus bar holding structure according to a comparison example in which, differently from the configuration of this embodiment, the fold-back part 35 is to be locked. In this bus bar holding structure, there are used a bus bar 511 excluding the notch 45 and a bus bar module 551. In this bus bar 511, the long side lateral edges 31a and 32a on the side of the folding part 535 are locked by a pair of locking arms 56b. In this case, it is supposed that an overlap distance from the tip ends of the long side lateral edges 31a and 32a to the locking tip end of the locking arm 56b is the same as in the configuration of this embodiment. However, even if the overlap distance L is the same as in the configuration of this embodiment, when the ends of the long side lateral edges 31a and 32a are the fold-back part 535, there exists an R portion 87. Therefore, the locking margin h of the locking arm 56b in a bus bar storing part 556 reduces substantially by a radius r of the R portion 87, thereby providing h=L−r.

On the other hand, in the bus bar holding structure according to this embodiment, since the locking part (locking arm 73) of the wire distribution body 52 locks the peripheral edge (deep end edge 81) of the notch 45 having the vertical side surface 53 parallel to the counter lead-out side wall 67 of the bus bar storing part 56, as shown in FIG. 5, all of the overlap distance L from the tip end of the deep end edge 81 to the locking tip end of the locking pawl 83 can be secured as a locking margin H. Therefore, the locking part according to this embodiment is enabled to positively lock the side edges (the long side lateral edges 31a and 32a) of the bus bar 11 in which the fold-back parts 35 are formed and thus, even in the bus bar 11 having a double layer structure, a holding force can be enhanced.

Also, in the bus bar holding structure of this embodiment, since the notch 45 is formed as the opening 47 before the a plurality of plate sections 31 and 32 are folded back by the fold-back part 35, a bending load when folding back the folding part 35 is reduced, thereby enabling reduction of working cost.

Further, since the bus bar 11 of this embodiment is positioned due to the engagement of the notch 45 with the engagement projection 75 of the bus bar storing part 35, there is eliminated the need to position the peripheral side edges (long side lateral edges 31a and 32a, short side lateral edges 31c and 32c) by the peripheral wall of the bus bar storing part 56.

This can alleviate the dimensional precision of the bus bar storing part 56, thereby enabling reduction of the molding cost of the wire distribution body 52 (mold cost).

Also, the locking arm 73 provided on the engagement projection 75 for positioning the bus bar 11 in the bus bar storing part 56 can positively lock the main body 12 of the bus bar 11. That is, since the locking arm 73 locks the positioned portion of the main body 12, it is possible to realize a locking structure in which relative displacement can hardly occur, thereby enabling positive locking of the bus bar 11.

Next, description is given of a bus bar according to a modification.

Here, the same composing parts as the above embodiment are given the same designations and thus the description thereof is omitted.

FIGS. 8A to 8C shows a bus bar working process according to a modification of the embodiment. FIGS. 8A to 8C are respectively perspective views of the respective steps of the working process.

As shown in FIG. 8A, a bus bar 11A is configured such that its main body 12A includes a plate part 33 serving as an intermediate layer, a plate part 31 as a lowermost layer and a plate part 32 as an uppermost layer. The intermediate-layer plate part 33 includes a long side lateral edge 33a and a short side lateral edge 33c, is formed to have the same substantially rectangular shape as the plate part 32, and is connected to such section of the uppermost-layer plate part 32 as exists on the opposite side of the lowermost-layer plate part 31. The long side lateral edges 32a and 33a of the plate parts 32 and 33 are connected to each other by fold-back parts 35A. The fold-back parts 35A are formed at intervals in the longitudinal direction, while the plate parts 32 and 33 are folded back by the fold-back parts 35A and are superimposed on top of each other. Further, the intermediate-layer plate part 33 also includes a hole 33b which constitutes a connection hole 21 of the main body part 12A.

In this modification as well, the bus bar 11A before bending is produced by pressing a metal plate.

Next, as shown in FIG. 8B, by bending the above bus bar 11A, the plate part 33 is folded back by the fold-back parts 35A and is superimposed on the plate part 32.

Further, as shown in FIG. 8C, by bending the above bus bar 11A further, the superimposed plate parts 32 and 33 are folded back by the fold-back parts 35 and are superimposed on the plate part 31. As the main body 12A is bent by the fold-back parts 35 and 35A at a position dividing an opening 47 into two, there is formed a notch 45 in the one-side long side lateral edge. Also, the conductor crimp piece 41 and wire caulking piece 42 of the wire connecting part 13 are raised.

In this manner, there are obtained the main body 12A composed of three layers of superimposed plate parts 31, 32 and 33 and the wire connecting part 13 capable of connecting the wire 15 thereto.

Like the bus bar 11A of this modification, the main body 12A may also have a three-layer structure composed of the three plate parts 31, 32 and 33. Here, the main body 12A may also be configured as a four- or more-layer structure including a plurality of intermediate-layer plate parts.

Therefore, according to a bus bar holding structure of this embodiment, a holding force provided by the locking part (locking arm 73) of the wire distribution body 52 can be enhanced with respect to the bus bars 11 and 11A configured such that the a plurality of plate parts 31, 32 and 33 are folded back by the fold-back parts 35 and 35A so as to be superimposed on each other.

Here, the invention is not limited to the above-mentioned embodiment but can be properly modified, improved, etc. Also, the materials, shapes, dimensions, quantity, arrangement locations etc. of the respective composing elements of the above embodiment are arbitrary and not limitative so long as they can attain the invention.

For example, in the above configuration example, the main body of the bus bar is fixed to the electrode terminal of the unit cell by the nut. However, with the configuration of the invention, the main body of the bus bar may also be fixed by welding to the electrode terminal. Also, the structure for connecting the wire to the wire connecting part of the bus bar is not limited to the crimping structure but, for example, it may be a press contact structure in which a wire is bitten into a pressure contact blade and is connected to the wire connecting part, or a welding connection structure in which a core wire of a wire is welded and is connected to the wire connecting part. Also, in the above configuration example, description is given of the case where the main body of the bus bar is formed in a rectangular plate shape and is stretched between the adjacent electrode terminals. However, the main body is not limited to the rectangular shape but may also be a square shape, an oval shape, or a polygonal shape more than a quadrangle shape.

Here, the characteristics of the above embodiment of the bus bar holding structure according to the invention are briefly summarized and listed in the following configurations [1] to [3].

[1] A bus bar holding structure comprising:
a bus bar (11, 11A); and
an insulating resin-made wire distribution body (52) holding the bus bar,
wherein the bus bar electrically connects together an adjacent terminals of a plurality of unit cells each having positive pole and negative pole electrode terminals,
wherein the bus bar includes a plate-shaped main body (12, 12A) and a wire connecting part (13) extended from the plate-shaped main body (12, 12A) and connected to an end of a wire (15),
wherein the plate-shaped main body includes a fold-back part (35, 35A) and a plurality of plate parts (31, 32, 33) separated from each other at the fold-back part (35, 35A) and folded back at the fold-back part (35, 35A) so as to be superimposed with each other,
wherein the plate-shaped main body (12, 12A) and the wire connecting part (13) are formed integrally,
wherein the wire distribution body (52) includes a locking part (locking arms 73) which locks lateral edges (long side lateral edges 31a, 32a) of the plate-shaped main body (12, 12A) so as to hold in a bus bar storing part (56),
wherein the fold-back part (35) includes a notch (45) having a vertical side surface parallel to a peripheral wall (counter lead-out side wall 67) of the bus bar storing part (56), and
wherein the locking part (locking arms 73) locks a peripheral edge (deep end edge 81) of the notch (45).

[2] The bus bar holding structure according to the above description [1],
wherein the peripheral wall (counter lead-out side wall 67) of the bus bar storing part (56) includes an engagement projection (75) which engages with the notch (45) so as to position the bus bar (11, 11A).

[3] The bus bar holding structure according to the above description [2],
wherein the locking part is a locking arm (73) formed in the engagement projection (75).

DESCRIPTION OF REFERENCE NUMERALS AND SIGNS

| | |
|---|---|
| 11: bus bar | 12: main body |
| 13: wire connecting part | 15: electric wire |
| 31: plate part | 32: plate part |
| 31a: long side lateral edge (side edge) | |
| 32a: long side lateral edge (side edge) | |
| 35: folding part | 45: notch |
| 52: wire distribution body | 53: vertical side surface |
| 56: bus bar storing part | |
| 67: counter lead-out side wall (peripheral wall) | |
| 73: locking arm (locking part) | |
| 75: engagement projection | |
| 81: deep end edge (peripheral edge) | H: locking margin |

What is claimed is:

1. A bus bar holding structure comprising:
a bus bar; and
an insulating resin-made wire distribution body holding the bus bar,
wherein the bus bar electrically connects together adjacent terminals of a plurality of unit cells each having positive pole and negative pole electrode terminals,
wherein the bus bar includes a plate-shaped main body and a wire connecting part extended from the plate-shaped main body and connected to an end of a wire,
wherein the plate-shaped main body includes a fold-back part and a plurality of plate parts separated from each other at the fold-back part and folded back at the fold-back part so as to be superimposed with each other,
wherein the plate-shaped main body and the wire connecting part are formed integrally,
wherein the wire distribution body includes a locking part which locks lateral edges of the plate-shaped main body so as to hold in a bus bar storing part,
wherein the fold-back part includes a notch having a vertical side surface parallel to a peripheral wall of the bus bar storing part, and
wherein the locking part locks a peripheral edge of the notch.

2. The bus bar holding structure according to claim 1,
wherein the peripheral wall of the bus bar storing part includes an engagement projection which engages with the notch so as to position the bus bar.

3. The bus bar holding structure according to claim 2,
wherein the locking part is a locking arm formed in the engagement projection.

* * * * *